United States Patent
Gruber et al.

(10) Patent No.: US 9,569,811 B2
(45) Date of Patent: Feb. 14, 2017

(54) RENDERING GRAPHICS TO OVERLAPPING BINS

(71) Applicant: QUALCOMM Incorporated, San Diego, CA (US)

(72) Inventors: Andrew Evan Gruber, Arlington, MA (US); Tao Wang, Sunnyvale, CA (US); Chunhui Mei, San Diego, CA (US); Gang Zhong, San Diego, CA (US); Feng Ge, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 153 days.

(21) Appl. No.: 14/316,275

(22) Filed: Jun. 26, 2014

(65) Prior Publication Data

US 2015/0379663 A1    Dec. 31, 2015

(51) Int. Cl.
*G06T 1/20* (2006.01)
*G06T 11/40* (2006.01)
*G06T 15/00* (2011.01)
*G09G 5/36* (2006.01)

(52) U.S. Cl.
CPC .................. *G06T 1/20* (2013.01); *G06T 11/40* (2013.01); *G06T 15/005* (2013.01); *G09G 5/363* (2013.01); *G09G 2340/0407* (2013.01); *G09G 2360/122* (2013.01)

(58) Field of Classification Search
None
See application file for complete search history.

(56) References Cited

U.S. PATENT DOCUMENTS

| | | | |
|---|---|---|---|
| 6,204,856 B1* | 3/2001 | Wood | G06T 15/10 345/419 |
| 6,768,492 B2 | 7/2004 | Dorbie | |
| 7,262,776 B1 | 8/2007 | Wilt et al. | |
| 7,570,271 B1* | 8/2009 | Brandt | G06F 3/14 345/428 |
| 8,325,203 B1* | 12/2012 | Donham | G06T 11/40 345/611 |
| 8,502,829 B2 | 8/2013 | Howson | |
| 2002/0070947 A1* | 6/2002 | Dorbie | G06T 15/04 345/582 |
| 2005/0134588 A1* | 6/2005 | Aila | G06T 15/60 345/426 |
| 2010/0259557 A1 | 10/2010 | McMullen et al. | |
| 2011/0292032 A1 | 12/2011 | Yang | |

(Continued)

OTHER PUBLICATIONS

International Search Report and Written Opinion—PCT/US2015/033849—ISA/EPO—Sep. 16, 2015 (14 pages).

(Continued)

*Primary Examiner* — Yingchun He
(74) *Attorney, Agent, or Firm* — Shumaker & Sieffert, P.A.

(57) ABSTRACT

In an example, a method for rendering graphics data includes rendering pixels of a first bin of a plurality of bins, wherein the pixels of the first bin are associated with a first portion of an image, and rendering, to the first bin, one or more pixels that are located outside the first portion of the image and associated with a second, different bin of the plurality of bins. The method also includes rendering the one or more pixels associated with the second bin to the second bin, such that the one or more pixels are rendered to both the first bin and the second bin.

30 Claims, 6 Drawing Sheets

(56) References Cited

U.S. PATENT DOCUMENTS

2013/0241938 A1   9/2013  Gruber et al.
2014/0118352 A1*  5/2014  Hakura ................ G06T 15/005
                                                    345/426
2014/0122812 A1*  5/2014  Hakura ................ G06T 15/005
                                                    711/144

OTHER PUBLICATIONS

Merry B., "Performance Tuning for Tile-Based Architectures", In: "OpenGL Insights", 2012, Taylor & Francis Group, LLC ISBN: 9781439893777, pp. 323-335.
Response to Written Opinion from corresponding PCT Application Serial No. PCT/US2015/033849 filed on Apr. 26, 2016 (18 pages).
Second Written Opinion from corresponding PCT Application Serial No. PCT/US2015/033849 dated Jun. 21, 2016 (9 pages).
Response to Second Written Opinion dated Jun. 21, 2016 from corresponding PCT Application Serial No. PCT/US2015/033849 filed Aug. 19, 2016 (20 pages).
International Preliminary Report on Patentability from corresponding PCT Application Serial No. PCT/US2015/033849 dated Sep. 30, 2016 (13 pages).

* cited by examiner

RENDERING GRAPHICS TO OVERLAPPING BINS

TECHNICAL FIELD

This disclosure relates to rendering computer graphics.

BACKGROUND

A device that provides content for visual presentation on an electronic display generally includes a graphics processing unit (GPU). The GPU renders pixels that are representative of the content on a display. The GPU generates one or more pixel values for each pixel on the display and performs graphics processing on the pixel values for each pixel on the display to render each pixel for presentation.

SUMMARY

The techniques of this disclosure generally relate to rendering graphics data. For example, the techniques of this disclosure include rendering a series of overlapping bins. That is, according to the techniques of this disclosure, a GPU may render pixels of a bin that are associated with a particular portion of an image. The GPU may also render one or more pixels that are associated with another bin and located outside the first bin when rendering the first bin. The GPU may render those pixels again when rendering the other bin. The techniques of this disclosure may, in some instances, allow the GPU to perform filtering operations on pixels located near the edge of a bin, e.g., by rendering one or more pixels located outside of the bin to be used as source pixels for performing filtering operations on the pixels located at the edge of the bin.

In an example, a method for rendering graphics data includes rendering pixels of a first bin of a plurality of bins, wherein the pixels of the first bin are associated with a first portion of an image, rendering, to the first bin, one or more pixels that are located outside the first portion of the image and associated with a second, different bin of the plurality of bins, and rendering the one or more pixels associated with the second bin to the second bin, such that the one or more pixels are rendered to both the first bin and the second bin.

In another example, a device for rendering graphics data includes a memory storing the graphics data, and one or more processors configured to render the graphics data. The one or more processors are configured to render pixels of the graphics data of a first bin of a plurality of bins, wherein the pixels of the first bin are associated with a first portion of an image, render, to the first bin, one or more pixels that are located outside the first portion of the image and associated with a second, different bin of the plurality of bins, and render the one or more pixels associated with the second bin to the second bin, such that the one or more pixels are rendered to both the first bin and the second bin.

In another example, a device for rendering graphics data includes means for rendering pixels of a first bin of a plurality of bins, wherein the pixels of the first bin are associated with a first portion of an image, means for rendering, to the first bin, one or more pixels that are located outside the first portion of the image and associated with a second, different bin of the plurality of bins, and means for rendering the one or more pixels associated with the second bin to the second bin, such that the one or more pixels are rendered to both the first bin and the second bin.

In another example, a non-transitory computer-readable medium has instructions stored thereon that, when executed, cause one or more processors to render pixels of a first bin of a plurality of bins, wherein the pixels of the first bin are associated with a first portion of an image, render, to the first bin, one or more pixels that are located outside the first portion of the image and associated with a second, different bin of the plurality of bins, and render the one or more pixels associated with the second bin to the second bin, such that the one or more pixels are rendered to both the first bin and the second bin.

The details of one or more examples of the disclosure are set forth in the accompanying drawings and the description below. Other features, objects, and advantages will be apparent from the description and drawings, and from the claims.

DETAILED DESCRIPTION

Figure 1:
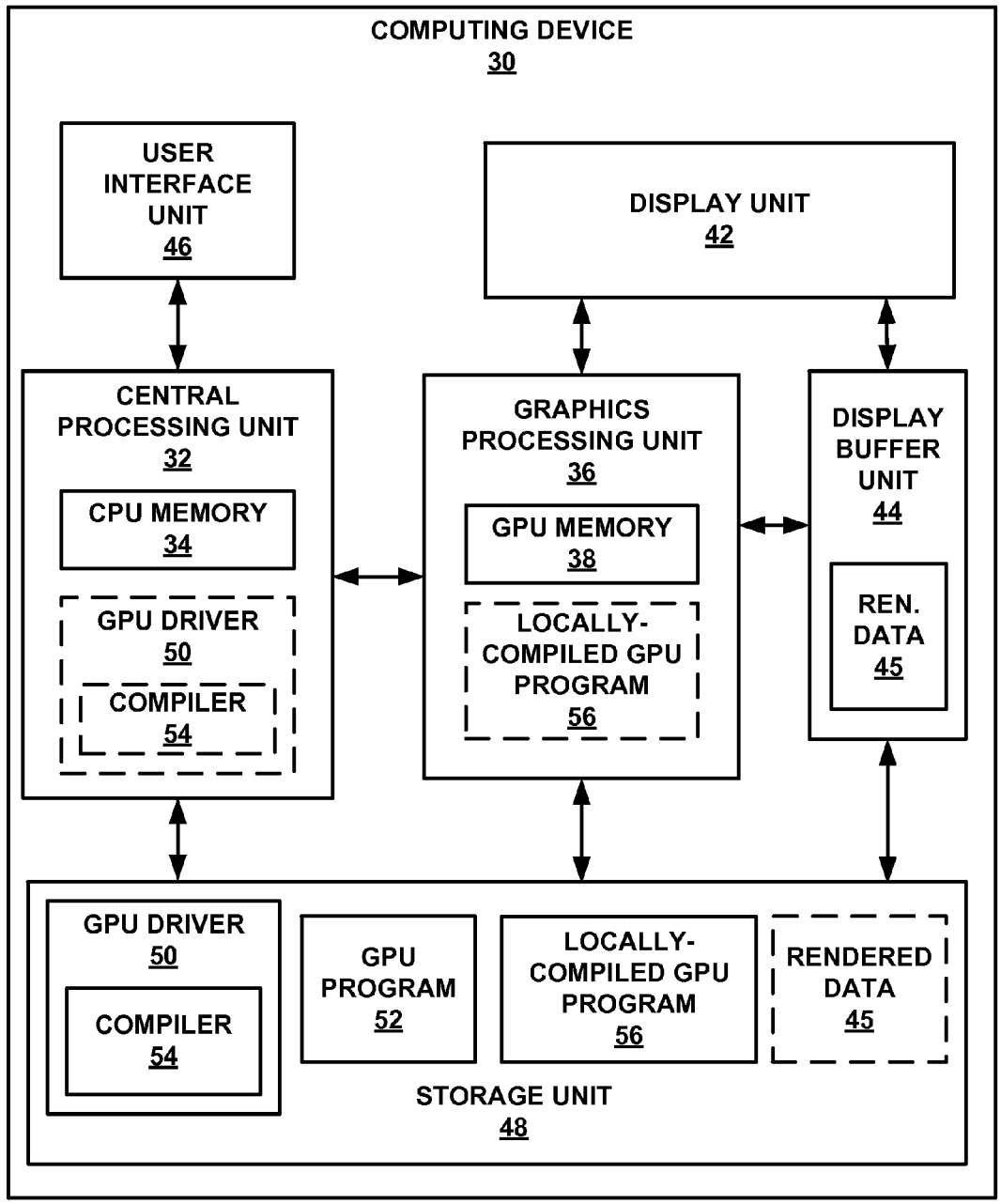
FIG. 1 is a block diagram illustrating a computing device that may be configured to implement aspects of this disclosure.

Traditional graphics processing unit (GPU) architectures may require a relatively large amount of data to be read from and written to system memory when rendering a frame of graphics data (which may be referred to as an image). Mobile architectures may lack the bandwidth capacity required for processing entire frames of data. Accordingly, tile-based architectures have been developed that break an image into multiple tiles. The tiles are sized so that they can be processed using a relatively small amount (e.g., 256 kB) of high bandwidth, on-chip graphics memory. That is, the size of each tile may depend on the amount of available on-chip graphics memory. The image is then reconstructed after processing each tile individually.

Tile-based rendering may be described with respect to a number of processing passes. For example, when performing tile-based rendering a GPU may perform a binning pass and a rendering pass. With respect to the binning pass, the GPU may process an entire image and sort rasterized primitives (such as triangles) into tile-sized areas that may be referred to as bins. For example, the GPU processes a command stream for an entire image and assigns the rasterized primitives of the image to bins.

In some examples, the GPU generates one or more visibility streams during the binning pass. A visibility stream indicates the primitives that are visible in the final image and the primitives that are invisible in the final image. For example, a primitive may be invisible if it is obscured by one or more other primitives such that the primitive cannot be seen in the shaded, finished image.

A visibility stream may be generated for an entire image, or may be generated on a per-bin basis (e.g., one visibility stream for each bin). In general, a visibility stream may include a series of 1's and 0's, with each "1" or "0" being associated with a particular primitive. Each "1" indicates that the primitive is visible in the final image. Each "0" indicates that the primitive is invisible in the final image. The visibility stream may control the rendering pass (described below). For example, the visibility stream may be used to skip sequences of invisible primitives during rendering. Accordingly, only the primitives that actually contribute to a bin, i.e., that are visible in the final image, are rendered and shaded, thereby reducing shading operations.

In other examples, a GPU may use a different process (e.g., other than or in addition to the visibility streams described above) to classify primitives as being located in a particular bin. In another example, a GPU may output a separate list per bin of "indices" that represent only the primitives that are present in a given bin. For example, the GPU may initially include all the primitives (i.e. vertices) in one data structure. The GPU may generate a set of pointers into the structure for each bin that only point to the primitives that are visible in each bin. Thus, only pointers for visible indices are included in a per-bin index list. Such pointers may serve a similar purpose as the visibility streams described above, with the pointers indicating which primitives (and pixels associated with the primitives) are included and visible in a particular bin.

Each rendering pass may include a clear/unresolve stage, a rendering stage, and a resolve stage. During the clear/unresolve stage, the GPU may initialize on-chip memory for a new tile to be rendered. For example, the GPU may initialize the on-chip memory to a certain value (clear), or read values from external memory to the on-chip memory (unresolve). During the rendering stage, the GPU may process the tile and store the processed tile to the on-chip memory. That is, the GPU may implement a graphics processing pipeline to determine pixel values and write the pixel values to the on-chip memory. During the resolve stage, the GPU may transfer the finished pixel values of the tile from the on-chip memory to an external memory, which may be referred to as a frame buffer. After finishing all of the tiles of an image, e.g., storing all of the tiles of the image to the frame buffer, the image is ready to be output (e.g., displayed).

The GPU may perform one or more operations on images stored to the frame buffer. For example, the GPU may scale an image stored to the frame buffer to change the resolution of the image. The GPU may perform such resolution scaling as a speed enhancement that has a quality-performance tradeoff. For example, in some instances, the GPU may render an image in a relatively lower resolution and scale the rendered image to a relatively higher resolution more quickly (e.g., using fewer resources and/or clock cycles) than performing all of the operations needed to directly render the image at the higher resolution.

In order to perform scaling, the GPU may apply a filter to an image stored in a frame buffer. For example, as noted above, the GPU may render each tile associated with an image to a frame buffer. Upon storing all of the tiles of the image to the frame buffer, the GPU may copy and scale the image from a low resolution frame buffer to a higher resolution frame buffer. Accordingly, in this example, the GPU performs two copy operations including a first copy operation from on-chip memory to the frame buffer (when rendering each tile) and a second copy operation from the low resolution frame buffer to the high resolution frame buffer.

Aspects of this disclosure may be used to eliminate the second copy operation. For example, rather than scaling graphics data using a second copy operation (at a frame buffer), a GPU may use the techniques of this disclosure to scale graphics data when copying graphics data from on-chip memory to a frame buffer. In this way, the techniques may improve performance when scaling graphics data with a tile-based renderer.

A GPU may apply to filter to a number of source pixels when scaling graphics data. For example, the GPU may blend a number of pixels according to a particular filtering algorithm to generate interpolated pixels at sub-pixel positions (e.g., relative to original, unfiltered pixel positions). Different filtering algorithms may require a different number of source pixels.

Certain filters, e.g., such as the scaling filter as noted above, may not be accurately applied in tile-based rendering schemes. For example, as noted above, tile-based rendering includes dividing an image into a number of tile sized bins and separately rendering the bins. After a GPU has rendered a bin and copied the data associated with the bin from the on-chip memory to the frame buffer the GPU may no longer access that data. Accordingly, the GPU may not access the source pixels needed for a particular filtering operation at the relative edges of a bin, because the GPU may not access graphics data from multiple bins.

According to aspects of this disclosure, a GPU may render a sequence of overlapping bins, which may allow filtering to be performed in tile-based rendering. For example, the GPU may determine an initial binning configuration for an image. When rendering the image, the GPU may render each bin as well as a number of pixels that may be used for filtering each bin, e.g., such as a border region surrounding each bin, and store the rendered pixels to an on-chip memory. The GPU may then perform a filtering operation on the bin of graphics data (e.g., a scaling operation) when copying the rendered bin data from on-chip memory to a frame buffer. The GPU may use the additional pixels of the border region when filtering the bin of graphics data. By filtering the graphics data using the additional pixels of the border region when copying the graphics data from the on-chip memory to the frame buffer, the GPU may avoid the copy operations that may be associated with filtering an image stored to the frame buffer.

While certain examples are described herein with respect to filtering graphics data for scaling the graphics data, the techniques of this disclosure are not limited in this way. That is, the techniques for rendering overlapping bins may be used in conjunction with a variety of different filters. In addition, while certain techniques are described as being carried out by a GPU, the techniques may be performed by a GPU, a GPU driver (e.g., as executed by a central processing unit (CPU)), or a combination thereof.

FIG. 1 is a block diagram illustrating a computing device 30 that may implement the techniques of this disclosure for rendering graphics data. Examples of computing device 30 include, but are not limited to, wireless devices, mobile or cellular telephones, including so-called smartphones, personal digital assistants (PDAs), video gaming consoles that include video displays, mobile video gaming devices, mobile video conferencing units, laptop computers, desktop computers, television set-top boxes, tablet computing devices, e-book readers, fixed or mobile media players, and the like.

In the example of FIG. 1, computing device 30 includes a central processing unit (CPU) 32 having CPU memory 34, a graphics processing unit (GPU) 36 having GPU memory 38 and one or more shading units 40, a display unit 42, a display buffer unit 44 storing rendered data 45 ("ren. data"), a user interface unit 46, and a data storage unit 48. In addition, storage unit 48 may store GPU driver 50 having compiler 54, GPU program 52, and locally-compiled GPU program 56.

Examples of CPU 32 include, but are not limited to, a digital signal processor (DSP), general purpose microprocessor, application specific integrated circuit (ASIC), field programmable logic array (FPGA), or other equivalent integrated or discrete logic circuitry. Although CPU 32 and GPU 36 are illustrated as separate units in the example of FIG. 1, in some examples, CPU 32 and GPU 36 may be integrated into a single unit. CPU 32 may execute one or more applications. Examples of the applications may include web browsers, e-mail applications, spreadsheets, video games, audio and/or video capture, playback or editing applications, or other applications that initiate the generation for image data to be presented via display unit 42.

In the example shown in FIG. 1, CPU 32 includes CPU memory 34. CPU memory 34 may represent on-chip storage or memory used in executing machine or object code. CPU memory 34 may each comprise a hardware memory register capable of storing a fixed number of digital bits. CPU 32 may be able to read values from or write values to local CPU memory 34 more quickly than reading values from or writing values to storage unit 48, which may be accessed, e.g., over a system bus.

GPU 36 represents one or more dedicated processors for performing graphical operations. That is, for example, GPU 36 may be a dedicated hardware unit having fixed function and programmable components for rendering graphics and executing GPU applications. GPU 36 may also include a DSP, a general purpose microprocessor, an ASIC, an FPGA, or other equivalent integrated or discrete logic circuitry.

GPU 36 also includes GPU memory 38, which may represent on-chip storage or memory used in executing machine or object code. GPU memory 38 may each comprise a hardware memory register capable of storing a fixed number of digital bits. GPU 36 may be able to read values from or write values to local GPU memory 38 more quickly than reading values from or writing values to storage unit 48, which may be accessed, e.g., over a system bus.

Display unit 42 represents a unit capable of displaying video data, images, text or any other type of data for consumption by a viewer. Display unit 42 may include a liquid-crystal display (LCD), a light emitting diode (LED) display, an organic LED (OLED), an active-matrix OLED (AMOLED) display, or the like.

Display buffer unit 44 represents a memory or storage device dedicated to storing data for presentation of imagery, such as computer generated graphics, still images, video frames, or the like (rendered data 45) for display unit 42. Display buffer unit 44 may represent a two-dimensional buffer that includes a plurality of storage locations. The number of storage locations within display buffer unit 44 may be substantially similar to the number of pixels to be displayed on display unit 42. For example, if display unit 42 is configured to include 640×480 pixels, display buffer unit 44 may include 640×480 storage locations storing pixel color and intensity information, such as red, green and blue pixel values, or other color values.

Display buffer unit 44 may store the final pixel values for each of the pixels processed by GPU 36. Display unit 42 may retrieve the final pixel values from display buffer unit 44, and display the final image based on the pixel values stored in display buffer unit 44.

User interface unit 46 represents a unit with which a user may interact with or otherwise interface to communicate with other units of computing device 30, such as CPU 32. Examples of user interface unit 46 include, but are not limited to, a trackball, a mouse, a keyboard, and other types of input devices. User interface unit 46 may also be, or include, a touch screen and the touch screen may be incorporated as a part of display unit 42.

Storage unit 48 may comprise one or more computer-readable storage media. Examples of storage unit 48 include, but are not limited to, a random access memory (RAM), a read only memory (ROM), an electrically erasable programmable read-only memory (EEPROM), CD-ROM or other optical disk storage, magnetic disk storage, or other magnetic storage devices, flash memory, or any other medium that can be used to store desired program code in the form of instructions or data structures and that can be accessed by a computer or a processor.

In some example implementations, storage unit 48 may include instructions that cause CPU 32 and/or GPU 36 to perform the functions ascribed to CPU 32 and GPU 36 in this disclosure. Storage unit 48 may, in some examples, be considered as a non-transitory storage medium. The term "non-transitory" may indicate that the storage medium is not embodied in a carrier wave or a propagated signal. However, the term "non-transitory" should not be interpreted to mean that storage unit 48 is non-movable. As one example, storage unit 48 may be removed from computing device 30, and moved to another device. As another example, a storage unit, substantially similar to storage unit 48, may be inserted into computing device 30. In certain examples, a non-transitory storage medium may store data that can, over time, change (e.g., in RAM).

Storage unit 48 stores a GPU driver 50 and compiler 54, GPU program 52, and locally-compiled GPU program 56. GPU driver 50 represents a computer program or executable code that provides an interface to access GPU 36. CPU 32 executes GPU driver 50 or portions thereof to interface with GPU 36 and, for this reason, GPU driver 50 is shown in the example of FIG. 1 as a dash-lined box labeled "GPU driver 50" within CPU 32. GPU driver 50 is accessible to programs or other executables executed by CPU 32, including GPU program 52.

GPU program 52 may include code written in a high level (HL) programming language, e.g., using an application programming interface (API). Examples of APIs include Open-Computing Language ("OpenCL"), Open Graphics Library ("OpenGL"), and DirectX, as developed by Microsoft, Inc. In general, an API includes a predetermined, standardized set of commands that are executed by associated hardware. API commands allow a user to instruct hardware components of a GPU to execute commands without user knowledge as to the specifics of the hardware components.

GPU program 52 may invoke or otherwise include one or more functions provided by GPU driver 50. CPU 32 generally executes the program in which GPU program 52 is embedded and, upon encountering GPU program 52, passes GPU program 52 to GPU driver 50. CPU 32 executes GPU driver 50 in this context to process GPU program 52. That is, for example, GPU driver 50 may process GPU program 52 by compiling GPU program 52 into object or machine code executable by GPU 36. This object code is shown in the example of FIG. 1 as locally compiled GPU program 56.

In some examples, compiler 54 may operate in real-time or near-real-time to compile GPU program 52 during the execution of the program in which GPU program 52 is embedded. For example, compiler 54 generally represents a unit that reduces HL instructions defined in accordance with a HL programming language to low-level (LL) instructions of a LL programming language. After compilation, these LL instructions are capable of being executed by specific types of processors or other types of hardware, such as FPGAs, ASICs, and the like (including, e.g., CPU 32 and GPU 36).

In the example of FIG. 1, compiler 54 may receive GPU program 52 from CPU 32 when executing HL code that includes GPU program 52. Compiler 54 may compile GPU program 52 to generate locally-compiled GPU program 56 that conforms to a LL programming language. Compiler 54 then outputs locally-compiled GPU program 56 that includes the LL instructions.

GPU 36 generally receives locally-compiled GPU program 56 (as shown by the dashed lined box labeled "locally-compiled GPU program 56" within GPU 36), whereupon, in some instances, GPU 36 renders one or more images and outputs the rendered images to display buffer unit 44. For example, GPU 36 may generate a number of primitives to be displayed at display unit 42. Primitives may include one or more of a line (including curves, splines, etc.), a point, a circle, an ellipse, a polygon (where typically a polygon is defined as a collection of one or more primitives) or any other two-dimensional (2D) primitive. The term "primitive" may also refer to three-dimensional (3D) primitives, such as cubes, cylinders, sphere, cone, pyramid, torus, or the like. Generally, the term "primitive" refers to any basic geometric shape or element capable of being rendered by GPU 36 for display as an image (or frame in the context of video data) via display unit 42.

GPU 36 may transform primitives and other attributes (e.g., that defines a color, texture, lighting, camera configuration, or other aspect) of the primitives into a so-called "world space" by applying one or more model transforms (which may also be specified in the state data). Once transformed, GPU 36 may apply a view transform for the active camera (which again may also be specified in the state data defining the camera) to transform the coordinates of the primitives and lights into the camera or eye space. GPU 36 may also perform vertex shading to render the appearance of the primitives in view of any active lights. GPU 36 may perform vertex shading in one or more of the above model, world or view space (although it is commonly performed in the world space).

Once the primitives are shaded, GPU 36 may perform projections to project the image into a unit cube with extreme points, as one example, at (−1, −1, −1) and (1, 1, 1). This unit cube is commonly referred to as a canonical view volume. After transforming the model from the eye space to the canonical view volume, GPU 36 may perform clipping to remove any primitives that do not at least partially reside within the view volume. In other words, GPU 36 may remove any primitives that are not within the frame of the camera. GPU 36 may then map the coordinates of the primitives from the view volume to the screen space, effectively reducing the 3D coordinates of the primitives to the 2D coordinates of the screen.

Given the transformed and projected vertices defining the primitives with their associated shading data, GPU 36 may then rasterize the primitives. During rasterization, GPU 36 may apply any textures associated with the primitives (where textures may comprise state data). GPU 36 may also perform a Z-buffer algorithm, also referred to as a depth test, during rasterization to determine whether any of the primitives and/or objects are occluded by any other objects. The Z-buffer algorithm sorts primitives according to their depth so that GPU 36 knows the order in which to draw each primitive to the screen. When binning (e.g., for tile-based rendering), shading may not be performed during rasterization. When rendering the primitives, however, GPU 36 may compute and set colors for the pixels of the screen covered by the primitives. GPU 36 then outputs rendered pixels to display buffer unit 44.

Display buffer unit 44 may temporarily store the rendered pixels of the rendered image until the entire image is rendered. Display buffer unit 44 may be considered as an image frame buffer in this context. Display buffer unit 44 may transmit the rendered image to be displayed on display unit 42. While shown and described separately, in some instances, display buffer unit 44 may form a portion of storage unit 48.

In some examples, GPU 36 may implement tile-based rendering to render an image. For example, GPU 36 may implement a tile-based architectures that renders an image by breaking the image into multiple portions, referred to as tiles. The tiles may be sized based on the size of GPU memory 38. For example, GPU 36 may render a tile to GPU memory 38. Upon completion of the tile, GPU 36 may transfer the tile from GPU memory 38 to storage unit 48 and/or display buffer unit 44 (as rendered data 45). After GPU 36 has rendered all of the tiles associated with a frame in this way, display buffer unit 44 may output the finished image to display unit 42. Rendering images using multiple tiles may reduce the amount and/or frequency of data transfer between GPU memory 38 and storage unit 48.

When performing tile-based rendering, GPU driver 50 may initially determine a binning configuration for rendering an image. For example, GPU driver 50 may determine a bin size based on the size of GPU memory 38. In addition, GPU driver 50 may apply a predetermined bin layout. For example, GPU driver 50 may set an initial bin in the upper left corner of an image. GPU driver 50 may add bins from left to right and top to bottom of the image until the entire image has been divided into bins.

GPU driver 50 also generates a command stream using GPU program 52. For example, the command stream may contain instructions for rendering images from GPU program 52. GPU driver 50 may add instructions to the command stream, which are executed by GPU 36 in the order in which they appear in the stream. The command steam may define the primitives that make up images from GPU program 52.

After the initial binning configuration and command stream has been set by GPU driver 50, GPU 36 may perform a binning pass and a rendering pass. With respect to the binning pass, GPU 36 may process an entire image and sort rasterized primitives into the bins of the initial binning configuration (set by GPU driver 50). GPU 36 may also generate a visibility stream or other information during the binning pass to indicate visible primitives, which may be separated according to bin. For example, GPU 36 may generate a visibility stream that includes a series of 1's and 0's, with each "1" indicating that associated pixels are visible in the final image and each "0" indicating that associated pixels are invisible in the final image. In other examples, GPU 36 may generate a per-bin list of indices (e.g., pointers to vertices) that represent only the primitives that are present in a given bin. As described herein, visibility information may generally refer to information such as visibility streams or other information that indicates which primitives and associated pixels are visible in a particular bin.

GPU driver 50 may access the visibility information and generate command streams for rendering each bin. Accordingly, the command streams may be set according to the initial binning configuration. That is, the command streams may be generated and ordered so that GPU 36 renders tiles of an image in the order of the initial binning configuration.

With respect to the rendering pass, GPU 36 may perform a clear/unresolve stage, a rendering stage, and a resolve stage. During the clear/unresolve stage, GPU 36 initializes GPU memory 38 for a new tile to be rendered. During the rendering stage, GPU 36 may render the tile and store the rendered tile to GPU memory 38. That is, GPU 36 may perform pixel shading and other operations to determine pixel values for each pixel of the tile and write the pixel values to GPU memory 38. During the resolve stage, GPU 36 may transfer the finished pixel values of the tile from GPU memory 38 to display buffer unit 44 (or storage unit 48).

GPU 36 may perform one or more operations on rendered data 45 that is stored to display buffer unit 44. For example, GPU 36 may filter rendered data 45 that is stored to display buffer unit 44. In an example for purposes of illustration, GPU 36 may apply a scaling filter to rendered data 45 to change the resolution of rendered data 45. Rendering data at a relatively lower resolution and scaling rendered data 45 to a higher resolution may result in a performance enhancement (with a quality cost), because GPU 36 may, in some instances, perform filtering operations more quickly than rendering the high resolution data.

In general, GPU 36 applies a filter to a number of source pixels when performing the filtering. For example, GPU 36 may execute a filtering kernel (as described in greater detail, for example, with respect to FIG. 3) to blend a number of pixels according to a particular filtering algorithm. In an example for purposes of illustration, GPU 36 may apply a filtering kernel to scale an image (or portion of an image) by generating a number of interpolated pixels. Different filtering algorithms may require a different number of source pixels.

However, certain filters may not be directly and/or accurately applied in tile-based rendering schemes. For example, as noted above, tile-based rendering includes dividing an image into a number of tile sized bins and separately rendering the bins. After GPU 36 has rendered a bin and copied the data associated with the bin from GPU memory 38 to display buffer unit 44, GPU 36 may no longer easily access that data (e.g., without the latency associated with retrieving the data from display buffer unit 44). Accordingly, GPU 36 may not access the source pixels needed for a particular filtering operation at the relative edges of a bin, because GPU 36 does not have access to graphics data from multiple bins.

Accordingly, in general, filtering rendered data 45 with a tile-based renderer (such as GPU 36) involves an additional copy operation at display buffer unit 44. For example, GPU 36 may perform two copy operations including a first copy operation from GPU memory 38 to display buffer unit 44 (when rendering each tile) and a second copy operation from a first location in display buffer unit 44 to a second location in display buffer unit 44. With respect to applying a scaling filter as an example, after rendering all tiles of an image and storing the tiles to an initial location of display buffer unit 44, GPU 36 may apply a scaling filter to the image and copy the image to a second location of display buffer unit 44.

Aspects of this disclosure may be used to eliminate the second copy operation noted above. For example, rather than filtering graphics data using a second copy operation (at display buffer unit 44), GPU 36 may use the techniques of this disclosure to filter graphics data when copying the graphics data from GPU memory 38 to display buffer unit 44. In this way, the techniques may improve performance when filtering graphics data with a tile-based renderer.

For example, according to aspects of this disclosure, GPU 36 may render a sequence of overlapping bins. That is, in an example for purposes of illustration, GPU 36 may render pixels of a first bin of a plurality of bins, where the pixels of the first bin are associated with a first portion of an image. GPU 36 may also include rendering, to the first bin, one or more pixels that are located outside the first portion and associated with a second, different bin of the plurality of bins. GPU 36 may also render the one or more pixels associated with the second bin to the second bin, such that the one or more pixels are rendered to both the first bin and the second bin.

In general, rendering "to a bin" may involve GPU 36 shading pixels for a given portion of an image and storing the shaded pixels to GPU memory 38. For example, GPU 36 may perform a rendering pass in which GPU 36 shades pixels for a portion of an image associated with a particular bin. However, according to aspects of this disclosure, GPU 36 may also render one or more pixels that are located spatially outside of the portion of the image to the bin, e.g., when rendering the particular bin and prior to rendering another, different bin.

To be clear, aspects of this disclosure allow one or more pixels of graphics data to be rendered with two separate bins. While a rasterized primitive may cross a tile boundary (e.g., the primitive is visible in more than one bin), typically GPU 36 only assigns each pixel of the primitive to a single bin and renders each pixel once. That is, as noted above, GPU 36 may generate visibility information during a binning pass that indicates visible pixels, and may separate the visibility information according to bin. Hence, GPU 36 renders pixels a single time according to the visibility stream.

According to aspects of this disclosure, GPU 36 may render one or more pixels of an image to multiple, different bins. That is, GPU 36 may render pixels of graphics data in a particular area of an image multiple times when rendering the image (e.g., a single pixel is treated/handled as occupying two bins). In example for purposes of illustration, GPU 36 may determine an initial binning configuration for an image. GPU 36 may generate visibility information indicating the visible pixels of the bins. According to aspects of this disclosure, GPU 36 may mark pixels as being visible in multiple bins, e.g., in multiple visibility streams. For example, GPU 36 may determine a border region that surrounds a given bin. The border region may include pixels of one or more other bins. GPU 36 may mark the pixels of the border region as being visible in the given bin.

When rendering the given bin, GPU 36 renders the pixels of the bin as well as one or more pixels of the determined border region. For example, as described in greater detail below, GPU 36 may determine a viewport for rendering the given bin that is larger than the given bin. GPU 36 stores the rendered data including the one or more pixels of the border region to GPU memory 38. GPU 36 may then apply a filter to the given bin when copying the rendered bin from GPU memory 38 to display buffer unit 44 (e.g., during the above-noted resolve stage). By filtering the graphics data using the additional pixels of the border region when copying the graphics data from GPU memory 38 to display buffer unit 44, GPU 36 may avoid copy operations that may be associated with filtering an image stored to display buffer unit 44.

It should be understood that computing device 30 is provided as merely an example, and other computing devices 30 performing the techniques of this disclosure may be arranged differently. For example, while display buffer unit 44 is shown and described separately from storage unit 48, in other examples display unit buffer 44 and storage unit 48 may be incorporated into the same component.

Moreover, it should be understood that computing device 30 may include additional modules or units not shown in FIG. 1 for purposes of clarity. For example, computing device 30 may include a transceiver unit for transmitting and receiving data, and may include circuitry to allow wireless or wired communication between computing device 30 and another device or a network. Computing device 30 may also include a speaker and a microphone, neither of which are shown in FIG. 1, to effectuate telephonic communications in examples where computing device 30 is a mobile wireless telephone, such as a smartphone, or a speaker and/or a microphone where computing device 30 is a media player or tablet computer. In some instances, user interface unit 46 and display unit 42 may be external to computing device 30 in examples where computing device 30 is a desktop computer or other device that is equipped to interface with an external user interface or display.

Figure 2:
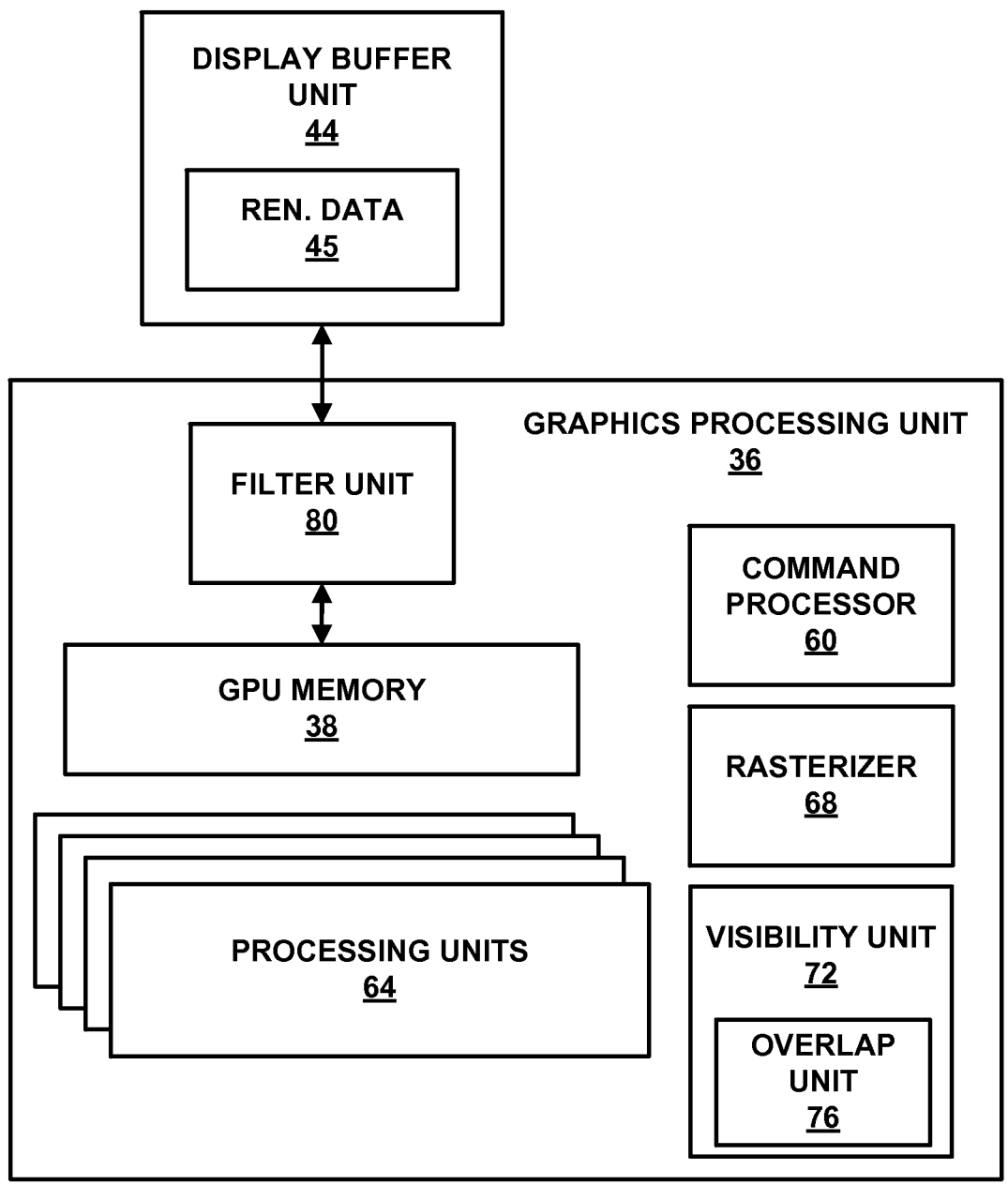
FIG. 2 is a block diagram illustrating another computing device that may be configured to implement aspects of this disclosure.

FIG. 2 is a block diagram illustrating portions of computing device 30 in greater detail. In the example of FIG. 2, GPU 36 includes GPU memory 38, command processor 60, one or more processing units 64, a rasterizer 68, a visibility unit 72 having an overlap unit 76, and a filter unit 80. It should be understood that certain units of FIG. 2 may be highly integrated, but are illustrated separately for conceptual purposes. Moreover, some units may be described with respect to a single unit for conceptual purposes, but may include one or more functional units.

FIG. 2 is provided as merely one example of a GPU that can utilize the techniques of this disclosure for rendering graphics data. In other examples, the techniques for rendering graphics data may be carried out by a variety of other GPUs having other components. For example, GPU 36 may also include a variety of other components and units related to analyzing and rendering images, such as an input assembly unit, texture units, scheduling units, arithmetic logic units (ALUs), or other fixed function or programmable GPU components.

Components of GPU 36 may access GPU memory 38 with relatively lower latency than accessing an external memory, such as storage unit 48 (FIG. 1). For example, GPU memory 38 may be an on-chip memory that is on-chip with GPU 36 and in relatively close proximity with GPU components, and may be associated with a dedicated memory bus within GPU 36. To access data stored in storage unit 48 (FIG. 1), in contrast, GPU 36 may have to share a memory bus with other components of computing device 30 (such as CPU 32), which may result in a more limited available bandwidth.

To take advantage of the high bandwidth, low latency GPU memory 38, as described above, GPU 36 may render graphics using a tile-based rendering architecture. GPU 36 may divide an image (which may also be referred to as a scene) into smaller portions (e.g., tiles). GPU memory 38 may store data associated with a tile while GPU 36 renders the tile. After rendering the tile, GPU 36 may resolve, or copy, the rendered pixel data from GPU memory 38 to display buffer unit 44 via a memory bus.

Command processor 60 may be responsible for reading a command stream from GPU driver 50. For example, as described above with respect to FIG. 1, GPU driver 50 may issue instructions for execution by GPU 36, which may be referred to as a command stream. Command processor 60 may read and/or decode the instructions of the command stream. In some examples, command processor 60 may read from a buffer containing the instructions of the command stream. Command processor 60 may also initiate execution of the instructions at GPU 36. For example, command processor 60 may feed instructions to a thread scheduler that schedules the instructions to be executed by processing units 64.

Processing units 64 may include one or more processing units, each of which may be a programmable processing unit or a fixed-function processing unit. In some examples, a programmable shader unit may include a plurality of processing units that are configured to operate in parallel, e.g., as an SIMD pipeline. A programmable shader unit may have a program memory that stores shader program instructions and an execution state register, e.g., a program counter register that indicates the current instruction in the program memory being executed or the next instruction to be fetched. The programmable shader units in processing units 64 may include, for example, vertex shader units, pixel shader units, geometry shader units, hull shader units, domain shader units, tessellation control shader units, tessellation evaluation shader units, compute shader units, and/or unified shader units.

Processing units 64 may be responsible for executing instructions. For example, processing units 64 may be responsible for executing one or more shader programs. A shader program, in some examples, may be a compiled version of a program written in a high-level shading language, such as, e.g., an OpenGL Shading Language (GLSL), a High Level Shading Language (HLSL), a C for Graphics (Cg) shading language, etc. In some examples, a shader program may be referred to as a shader kernel. In general, the shader kernel may include program code that defines a task or function to be performed by GPU 36.

Hence, processing units 64 may be programmable shading units responsible for vertex, geometry, and pixel shading operations. For example, one or more of processing units 64 may be responsible for determining vertex positions of primitives (e.g., triangles) that make up a scene to produce a triangle mesh of the scene. In addition, one or more of processing units 64 may be responsible for generating primitives from the triangle mesh, as well as pixel filling and shading operations.

Processing units 64 may be configured identically, or may be individually configured to perform a specific task. For example, one of processing units 64 may be designated as a "binning shader" that is responsible for binning operations, while the remaining processing units 64 may be responsible for performing the vertex, geometry, or pixel shading operations described above.

Rasterizer 68 may include one or more fixed-function processing units that are hard-wired to perform certain functions. Although the fixed function hardware may be configurable, via one or more control signals for example, to perform different functions, the fixed function hardware typically does not include a program memory that is capable of receiving user-compiled programs. In some examples, rasterizer 68 may be configured to perform raster operations, such as, e.g., depth testing, scissors testing, alpha blending, etc.

In addition, rasterizer 68 may receive vertex information and may generate a representation of primitives of a scene. In some examples, rasterizer 68 applies predefined rules to received vertex information to determine which primitives are visible in the final scene. Rasterizer 68 may cull, or remove, any invisible primitives of the scene. For example, rasterizer 68 may perform z-buffering (which may also be referred to as depth testing) to identify primitives that are covered by other primitives, and therefore not visible in the final scene.

Visibility unit 72 may include any combination of fixed function hardware components and/or programmable processing units. Visibility unit 72 may receive the rasterized data from rasterizer 68 and generate visibility information. In some examples, visibility unit 72 may generate one or more visibility streams. To generate the visibility stream, visibility unit 72 may distribute each of the visible primitives, as determined by rasterizer 68, to bins. Each bin may represent a tile of the finished scene. In other examples, visibility unit 72 may generate a per-bin list of indices (e.g., pointers to vertices) that represent only the primitives that are present in a given bin.

With respect to visibility streams, visibility unit 72 may generate a separate visibility stream for each of the bins. For example, visibility unit 72 may generate a visibility stream for a particular bin by setting flags to indicate which pixels of primitives of the particular bin are visible and which pixels of primitives of the particular bin are invisible. According to some aspects, visibility unit 72 may set a flag value of "1" to indicate that a primitive is visible in the final scene and a flag value of "0" to indicate that a primitive is not visible in the final scene. In some examples, visibility unit 72 may operate according to a course rasterization of an image. That is, rather than indicating the visibility status of each pixel, visibility unit 72 may determine visibility information on a coarser scale (e.g., for blocks of four pixels).

In any case, visibility unit 72 may generate a plurality of visibility streams comprising flags that indicate the visible pixels of the primitives of each of the bins. In some examples, visibility unit 72 may compress the visibility streams. For example, visibility unit 72 may apply a compression scheme to reduce large strings of "0" flags and reduce the amount of memory required to restore the visibility streams.

According to aspects of this disclosure, visibility unit 72 includes overlap unit 76. Visibility unit 72 may use overlap unit 76 when generating visibility information for bins. For example, overlap unit 76 may determine an overlap region for each of the bins. The overlap region may include one or more pixels that are located outside the boundary of a particular bin. The overlap region may include, for example, a number of pixels that neighbor a particular bin. Overlap unit 76 may mark one or more pixels that are located outside a particular bin as being visible pixels that are to be rendered with the particular bin.

In some examples, overlap unit 76 may implement an overlap region having a fixed size. For example, overlap unit 76 may implement an overlap region of 16 pixels. In this example, overlap unit 76 may determine an overlap region that includes a border of pixels wide outside a bin under consideration that is 16 pixels wide and neighbors the bin. In other examples, overlap unit 76 may dynamically determine an overlap region. For example, as noted above, different filters may require a different number of source pixels. According to aspects of this disclosure, overlap unit 76 may determine an overlap region based on a filter being used on the rendered data. That is, for a filter that considers eight source pixels, overlap unit 76 may determine an overlap region that includes all eight source pixels.

Filter unit 80 may include programmable or fixed function processing units for filtering rendered graphics data. For example, filter unit 80 may access rendered graphics data (e.g., shaded pixels) from GPU memory 38 and apply one or more filters to the graphics data. Filter unit 80 may apply, as examples, any combination of anti-aliasing filters, Gaussian filters, Lanczos filters, bicubic filters, bilinear, sinc filters, or the like.

In some examples, filter unit 80 may apply one or more filters to scale rendered graphics data. For example, filter unit 80 may execute one or more scaling kernels to interpolate pixel data and increase (or decrease) the resolution of an image. In some examples, a user (e.g., an application developer) may select a particular scaling function to be executed by filter unit 80, e.g., using an API. The user may select a scaling filter based on a rate/performance tradeoff. That is, the user may select a scaling filter that considers a relatively large number of pixels to increase the visual quality of the scaled graphics data, or a scaling filter that considers fewer source pixels to increase the speed with which filtering unit 80 filters the graphics data. Thus, in some examples, filter unit 80 may not be hard coded to execute a particular filtering kernel, and may instead adaptively apply a particular scaling function.

While filter unit 80 is illustrated in FIG. 2 as a separate processing unit for purposes of explanation, it should be understood that filter unit 80 may be highly integrated with other components of GPU 36 (and/or CPU 32). For example, in some instances, the functions attributed to filter unit 80 above may instead (or additionally) be performed by processing units 64. That is, one or more programmable shader units of processing units 64 may be configured to execute one or more filtering kernels for filtering rendered graphics data.

In operation, as noted above, GPU 36 may render an image using a binning pass and a rendering pass. During the binning pass, GPU 36 (and/or GPU driver 50) may divide an image into tile-sized bins. Command processor 60 may process a command stream for an entire image. Rasterizer 68 may rasterize and sort rasterized primitives (such as triangles) defined by the command stream to the bins. In some examples, rasterizer 68 may perform a so-called coarse rasterization. That is, rather than performing the rasterization on a per-pixel basis, rasterizer 68 may rasterize primitives using a coarser grain processing (e.g., 2×2 pixel blocks).

Visibility unit 72 generates visibility information during the binning pass. As noted above, visibility information indicates which primitives are visible in a final image that is to be output to display buffer unit 44. A primitive may be invisible if it is obscured by one or more other primitives such that the primitive cannot be seen in the shaded, finished image.

According to aspects of this disclosure, overlap unit 76 may modify the manner in which visibility unit 72 generates visibility information. For example, in general, visibility unit 72 may mark pixels of an image as being visible in only one bin. That is, while a rasterized primitive may span more than one bin, visibility unit 72 assigns each pixel of the primitive to a single bin, e.g., to a single visibility stream associated with a single bin. However, according to aspects of this disclosure, overlap unit 76 may mark a single pixel as being visible in more than one bin (e.g., more than one visibility stream). By marking the pixel as being visible in more than one bin (e.g., more than one visibility stream), GPU 36 may render the same pixel with more than one bin, such that at least a portion of the bins include overlapping visible pixels.

As noted above, overlap unit 76 may, in some examples, implement an overlap region having a fixed size. In other examples, overlap unit 76 may dynamically determine the number of pixels in an overlap region, e.g., based on a filter being applied to the rendered pixels. Overlap unit 76 may roughly size the overlap region to accommodate a wide variety of possible filters. That is, overlap unit 76 may overestimate the size of the overlap region without incurring a large processing penalty. For example, because rasterizer 68 may perform binning operations using a relatively coarse grain, overlap unit 76 may also determine an overlap region using a relatively coarse grain.

Following the binning pass, GPU 36 may sequentially render each of the bins including the respective overlap regions for the bins. Each rendering pass may include a clear/unresolve stage, a rendering stage, and a resolve stage. During the clear/unresolve stage, GPU 36 may initialize GPU memory 38 for a new bin to be rendered. For example, GPU 36 may initialize GPU memory 38 to a certain value (clear), or read values from display buffer unit 44 or storage unit 48 (FIG. 1) to GPU memory 38 (unresolve).

During the rendering stage, GPU 36 may process each bin and store each processed bin to GPU memory 38. For example, GPU 36 may implement a graphics processing pipeline, e.g., using processing units 64, to determine pixel values. GPU 36 then writes the shaded pixels to GPU memory 38.

According to aspects of this disclosure, GPU 36 (and/or GPU driver 50 (FIG. 1)) may determine an overlap region in which pixels are rendered to more than one bin for the image. GPU 36 may size the overlap region used during the rendering pass to be the same as or different than the overlap region used during binning For example, GPU 36 may implement an overlap region having a fixed size. In other examples, GPU 36 may dynamically determine the number of pixels in an overlap region, e.g., based on a filter being applied to the rendered pixels.

In some examples, according to aspects of this disclosure, GPU 36 may apply a finer grain overlap region at the rendering passes (for each bin) than at the binning pass. For example, because pixel shading during rendering may consume more processing resources than the binning/visibility pass, GPU 36 may apply a more precise overlap region at the rendering passes than the binning pass. In some examples, GPU 36 may apply a relatively smaller overlap region at the rendering pass than at the binning pass.

To implement the overlap region when rendering, GPU 36 (and/or GPU driver 50 (FIG. 1)) may determine a viewport that is larger than the bin size. For example, GPU 36 may determine scissor parameters, e.g., to be applied by rasterizer 68, that are larger than the bin size. In this example, GPU 36 may set scissor parameters that include the bin size and the size of the overlap region.

In an example for purposes of illustration, assume that an interior bin (covering an interior region of an image) is 40 pixels wide and an overlap region is four pixels wide. In this example, GPU 36 may determine a scissor area that is 48 pixels wide (e.g., the 40 pixel bin width and four pixels on each side of the bin for the overlap region). GPU 36 may use the portion of the visibility information consistent with the scissor area to shade the visible pixels to the bin and overlap region and store the shaded pixels to GPU memory 38. For example, GPU 36 renders the bin using the 48 pixel width. Accordingly, GPU 36 may render the four pixels of each of the adjacent bins twice (e.g., once with the current bin and once when rendering the adjacent bin).

GPU 36 may repeat the process described above for each bin. That is, GPU 36 may determine the size of the bin. GPU 36 may then determine scissor parameters that include the bin and the overlap region. GPU 36 may then render the pixels identified by the scissor region and store the rendered pixels to GPU memory 38. In this way, GPU 36 may render a series of overlapping bins.

During the resolve stage, GPU 36 may transfer the finished pixel values of a bin from GPU memory 38 to display buffer unit 44. According to aspects of this disclosure, filter unit 80 may apply a filter to the rendered pixels when transferring the graphics data from GPU memory 38 to display buffer unit 44. For example, because the rendered data includes the pixels of the bin and the pixels of the overlap region, filter unit 80 may accurately apply a filter to all pixels of the bin, including the pixels located at the edges of the bin. That is, filter unit 80 may identify source pixels in the overlap region when filtering pixels within the bin. After transferring all of the rendered and scaled bins from GPU memory 38 to display buffer unit 44, the image is ready to be output (e.g., displayed).

In this way, GPU 36 may use the techniques of this disclosure to render overlapping bins and accurately apply one or more filters to the bins without a separate copy at display buffer unit 44. In some examples, GPU 36 may use the techniques to scale rendered data when transferring graphics data from GPU memory 38 to display buffer unit 44.

In some examples, GPU 36 may dynamically determine whether to implement the techniques for rendering overlapping bins at the time of rendering. For example, a flag or other indication may be provided (e.g., via an API command) that signals whether GPU 36 will apply a filter to rendered data of an image. In this example, GPU 36 may read the flag prior to rendering the image an perform the techniques described herein to render overlapping bins for the image.

Figure 3:
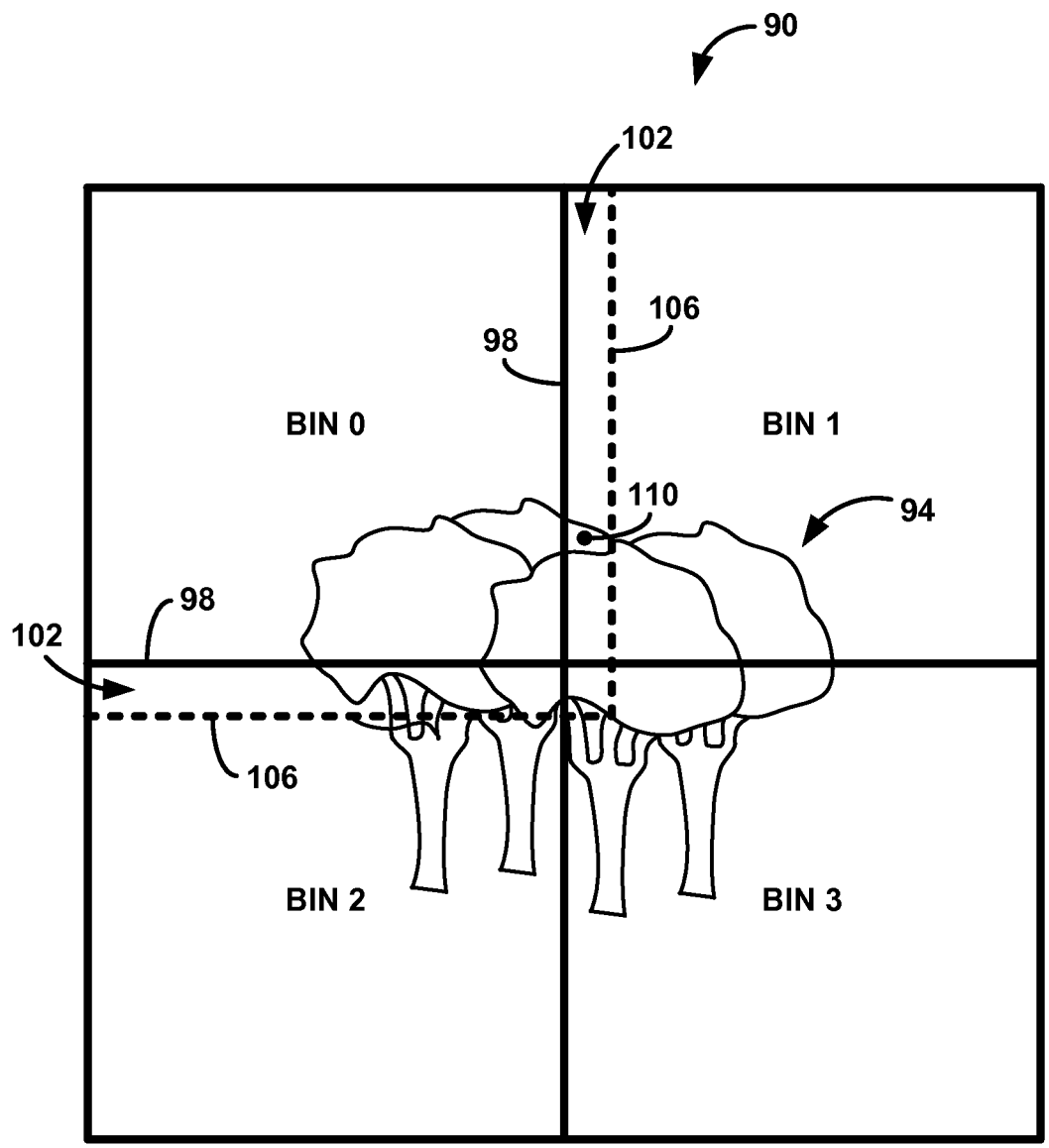
FIG. 3 is a diagram illustrating rendering overlapping bins, consistent with the techniques of this disclosure.

FIG. 3 is a diagram illustrating an image 90 having objects 94 for rendering (shown in the example of FIG. 3 as trees). In some examples, image 90 may be rendered by computing device 30, as shown and described above with respect to FIGS. 1 and 2. However, while the example shown in FIG. 3 is described with respect to computing device 30, it should be understood that the techniques may be performed by a variety of other computing devices having a variety of other components.

GPU driver 50 may generate a command stream defining image 90 for rendering by GPU 36. The command stream may include instructions for rendering primitives of objects 94, as well as an initial binning configuration containing bin 0, bin 1, bin 2, and bin 3. In some examples, as noted above, GPU driver 50 may determine the size of bins 0-3 based on a size of GPU memory 38. For example, GPU driver 50 may size bins 0-3 such that data associated with each of the bins may be stored at GPU memory 38. Using bin 0 as an example, bin 0 has a bin boundary 98 that defines the size/area of bin 0.

GPU driver 50 may use a predetermined bin arrangement to break image 90 into bins 0-3. That is, in the example FIG. 3, GPU driver 50 may arrange the bins from left to right and top to bottom of image 90. Accordingly, GPU 36 may render image from left to right and top to bottom, initially rendering bin 0, followed by bin 1, bin 2, and bin 3. GPU driver 50 may be preconfigured to determine the initial binning configuration.

According to aspects of this disclosure, GPU 36 defines an overlap region 102 for bin 0, as an example, by setting overlap boundary 106. In general, overlap boundary 106 follows the contour of bin boundary 98, and overlap region 102 includes the pixels between bin boundary 98 and overlap boundary 106. As described in greater detail below, overlap boundary 106 may be set a fixed distance (a fixed number of pixels) from bin boundary 98 or may be dynamically determined prior to rendering. The fixed distance may be predetermined or may be programmable, e.g., using an API command. Overlap boundary 106 may be the same for both a binning pass and a rendering pass, or may be set to different distances for the binning pass and the rendering pass.

In general, GPU 36 may render the pixels of overlap region 102 when rendering more than one bin. With respect to pixel 110 as an example, GPU 36 may render pixel 110 when rendering both bin 0 and bin 1. That is, GPU 36 may render pixel 110 when rendering bin 0, because pixel 110 is located in overlap region 102. GPU 36 may also render pixel 110 a second time when rendering bin 1, because pixel 110 is located in bin 1.

As described above, GPU 36 may implement the techniques for rendering overlapping bins when filtering rendered graphics data. In this example, GPU 36 may perform a binning pass on image 90 to generate visibility information (e.g., such as visibility streams) for each of bins 0-3. GPU 36 may then perform a series of rendering passes for each respective bin. The example below is described with respect to binning and rendering bin 0 as an example, but may be performed for each of bins 0-3.

During the binning pass, overlap unit 76 may determine overlap boundary 106 as being a fixed distance from bin boundary 98. In an example for purposes of illustration, overlap unit 76 may determine that overlap boundary 106 follows the contour of bin boundary 98 and is eight pixels wide. In this example, assuming a bin 0 size of L×W, overlap unit 76 may set overlap boundary 106 based on W+8×L+8. In some examples, overlap unit 76 may determine overlap boundary 106 based on the filter being applied to the rendered image 90.

After determining overlap boundary 106 (thereby defining overlap region 102), overlap unit 76 mark one or more pixels of overlap region 102 as being visible pixels in bin 0. For example, as noted above, overlap unit 76 may mark pixel 110 as being a visible pixel in the visibility information for bin 0.

When rendering to bin 0, GPU 36 may render bin 0 using a viewport that is expanded beyond bin boundary 98. For example, rasterizer 68 may determine scissor parameters that include at least some of overlap region 102. For example, in some instances, GPU 36 may determine a viewport that is equal to overlap boundary 106 determined during binning In other examples, GPU 36 may determine a viewport that is less than overlap boundary 106 determined during binning GPU 36 may determine the viewport, in some examples, based on the filter being applied to the rendered data.

In any case, GPU 36 may perform a rendering stage of the rendering pass to generate pixel values (shade) for pixels of bin 0. In addition, according to aspects of this disclosure, GPU 36 may generate pixel values for pixels of overlap region 102 that are marked as being visible pixels in the visibility information for bin 0 and that are within the scissor parameters set by GPU 36. GPU 36 may store the shaded pixels to GPU memory 38. In this way, GPU 36 may render both the pixels associated with bin 0 and one or more pixels that are located spatially outside of bin 0 (e.g., one or more of the pixels of overlap region 102) to bin 0.

During the resolve stage of the rendering pass of bin 0, GPU 36 may transfer the finished pixel values from GPU memory 38 to display buffer unit 44. According to aspects of this disclosure, filter unit 80 may apply a filter to the rendered pixels when transferring the graphics data from GPU memory 38 to display buffer unit 44. For example, because the rendered data includes the pixels of bin 0 and the pixels of overlap region 102 (or at least a portion of such pixels, in instances in which the viewport is set smaller than overlap boundary 106), filter unit 80 may accurately apply a filter to all pixels of bin 0, including the pixels located at the edges of bin 0. That is, filter unit 80 may identify source pixels in overlap region 102 when filtering pixels within bin 0.

Again, while described with respect to bin 0 for purposes of example, GPU 36 may repeat the process for each of bins 1-3. After transferring all of the rendered and filtered bins from GPU memory 38 to display buffer unit 44, image 90 is ready to be output (e.g., displayed).

Figure 4:
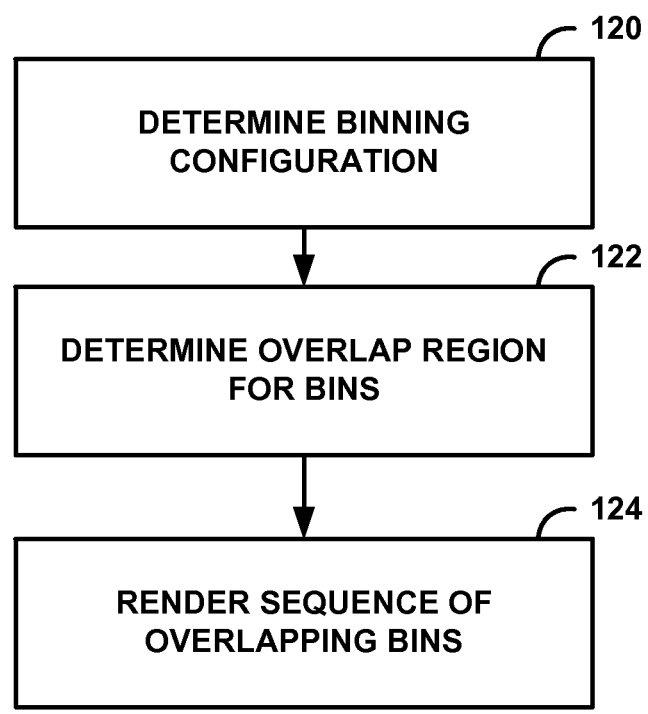
FIG. 4 is a flow diagram illustrating an example process for rendering graphics, according to aspects of this disclosure.

FIG. 4 is a flow diagram illustrating an example process for rendering graphics, according to aspects of this disclosure. While the process shown in FIG. 4 is described as being carried out by CPU 32 and/or GPU 36 (FIGS. 1 and 2), the techniques may be implemented by a variety of other processing units.

In the example of FIG. 4, GPU 36 (and/or GPU driver 50) may determine an initial binning configuration (120). For example, GPU 36 may determine a bin size based on a size of GPU memory 38, such that all of the pixel data associated with a bin can be stored to GPU memory 38 during rendering. GPU 36 may then divide the image into bins so that each of the pixels of the image is associated with one bin.

GPU 36 may determine an overlap region for the bins (122). In general, the overlap region allows GPU 36 to render pixels to more than one bin. For example, GPU 36 may render the pixels of the bin as well as the pixels of the overlap region for the bin, which may be spatially assigned in the binning configuration to a different bin. As described above, GPU 36 may determine the same or differently sized overlap regions when performing a binning pass and when performing the rendering passes of a rendering process. In some examples, GPU 36 may size the overlap region based on a filter being applied to the rendered graphics data.

GPU 36 then renders a sequence of overlapping bins (124). For example, when rendering a particular bin, GPU 36 may expand the area being rendered such that GPU 36 shades one or more pixels that are located outside of the particular bin to the particular bin. That is, GPU 36 stores the shaded one or more pixels that are located outside of the particular bin to GPU memory 38 with the pixels that are spatially located within the particular bin.

In an example for purposes of illustration, GPU 36 may render pixels of a first bin of a plurality of bins, where the pixels of the first bin are associated with a first portion of an image. GPU 36 may also render, to the first bin, one or more pixels that are located outside the first portion and associated with a second, different bin of the plurality of bins. In addition, GPU 36 may render the one or more pixels associated with the second bin to the second bin, such that the one or more pixels are rendered to both the first bin and the second bin.

Figure 5:
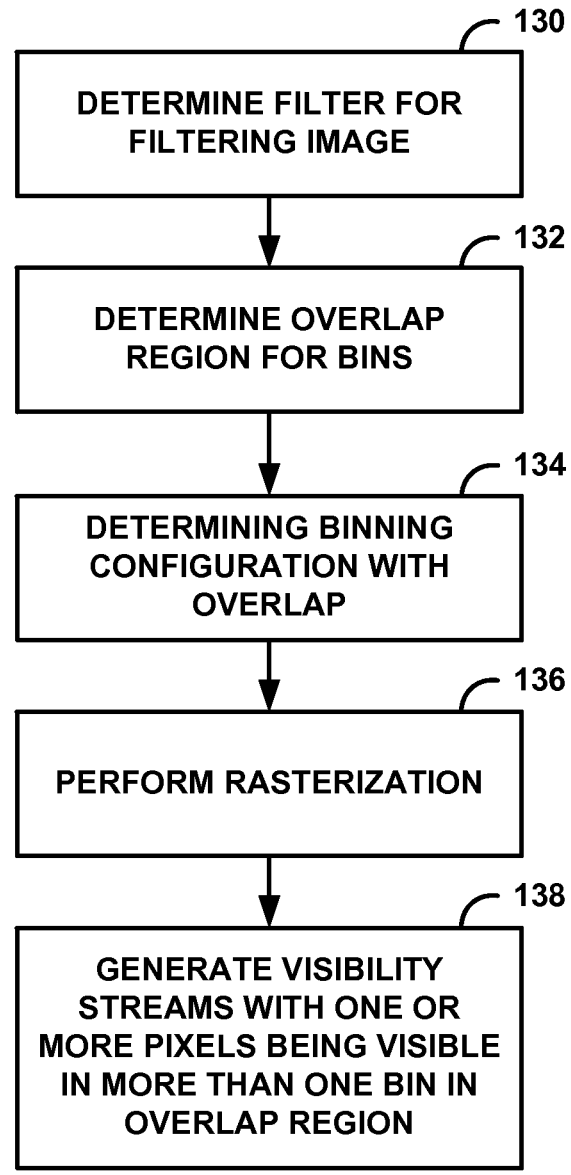
FIG. 5 is a flow diagram illustrating an example process for performing a binning pass, according to aspects of this disclosure.

FIG. 5 is a flow diagram illustrating an example process for performing a binning pass, according to aspects of this disclosure. While the process shown in FIG. 5 is described as being carried out by CPU 32 and/or GPU 36 (FIGS. 1 and 2), the techniques may be implemented by a variety of other processing units.

GPU 36 determines a filter for an image (130). For example, GPU 36 may determine that the rendered image is to be filtered after rendering all of the bins of the image. In some examples, GPU 36 may determine a scaling filter for the image that is operable to scale the resolution of the image. GPU 36 may determine the scaling filter based on one or more commands included in a command stream.

GPU 36 determines an overlap region for bins of the image (132). In general, as described herein, the overlap region defines an area in which pixels may be rendered to more than one bin. In some examples, the overlap region may be a fixed size that is applied to each of the bins. In other examples, GPU 36 may size the overlap region based on the determined filter noted above.

GPU 36 determines a binning configuration of an image with the overlap region (134). For example, GPU 36 may determine a bin size based on a size of GPU memory 38, such that all of the pixel data associated with a bin can be stored to GPU memory 38 during rendering. GPU 36 may also consider the data of the overlap region that will be rendered to the bins, such that all of the bin data as well as all of the overlap region data may be stored to GPU memory 38. GPU 36 may then divide the image into bins so that each of the pixels of the image is associated with one bin.

GPU 36 performs rasterization on the image and sorts rasterized primitives (e.g., triangles) to each of the determined bins (136). In some examples, GPU 36 may perform a so-called coarse rasterization to sort primitives to each of the determined bins. That is, rather than performing the rasterization on a per-pixel basis, GPU 36 may rasterize the image on a per-block of pixels basis.

GPU 36 generates visibility information for the image (e.g., one visibility stream per bin) with one or more pixels of the image being visible in more than one bin in the overlap region (138). For example, according to aspects of this disclosure, GPU 36 may generate a visibility information for a particular bin that indicates whether pixels located in the bin are visible, and also indicates whether one or more pixels located outside of the bin but being rendered to the bin (i.e., pixels of the overlap region) are visible.

Figure 6:
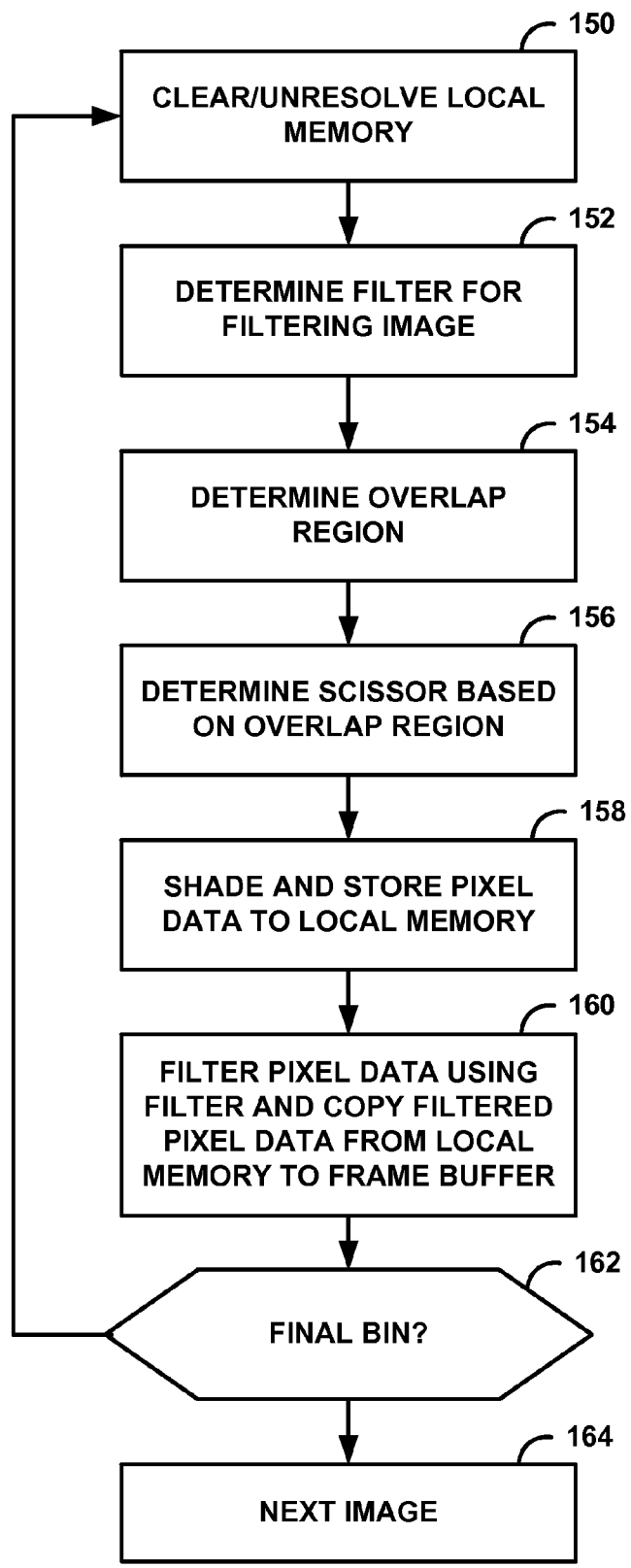
FIG. 6 is a flow diagram illustrating an example process for performing a rendering pass, according to aspects of this disclosure.

FIG. 6 is a flow diagram illustrating an example process for performing a rendering pass, according to aspects of this disclosure While the process shown in FIG. 6 is described as being carried out by CPU 32 and/or GPU 36 (FIGS. 1 and 2), the techniques may be implemented by a variety of other processing units.

GPU 36 clears and/or unresolves local memory, i.e., GPU memory 38 (150). GPU 36 also determines a filter for filtering the image being rendered (152). For example, as described above with respect to FIG. 5, GPU 36 may determine that the rendered image is to be filtered after rendering all of the bins of the image. In some examples, GPU 36 may determine a scaling filter for the image that is operable to scale the resolution of the image. GPU 36 may determine the scaling filter based on one or more commands included in a command stream.

GPU 36 determines an overlap region (154). Again, as noted above, the overlap region defines an area in which pixels may be rendered to more than one bin. In some examples, the overlap region may be a fixed size that is applied to each of the bins being rendered. In other examples, GPU 36 may size the overlap region based on the determined filter noted above. In some examples, the overlap region may be sized differently for rendering than for binning (as described, for example, with respect to FIG. 5).

GPU 36 determines scissor parameters based on the overlap region (156). For example, GPU 36 may initially determine a viewport for pixels to be rendered that includes the pixels located within the bin being rendered. GPU 36 may then expand the viewport to include pixels of the overlap region. GPU 36 may set the scissor parameters to include the expanded viewport.

GPU 36 shade sand stores pixels of the bin being rendered to local memory, i.e., GPU memory 38 (158). For example, GPU 36 may use a graphics processing pipeline to determine pixel values for each of the visible pixels of the bin being rendered. In addition, GPU 36 may determine pixel values for each of the pixels included in the determined overlap region. GPU 36 may store the determined pixel values of the bin and the overlap region to GPU memory 38.

GPU 36 may then filter the rendered pixel data using the determined filter and copy the filtered pixel data form local memory to a frame buffer, e.g., display buffer unit 44 (160). For example, according to aspects of this disclosure, GPU 36 may filter the pixel data while copying the pixel data to the frame buffer, such that another copy operation is not required at the frame buffer. GPU 36 then determines whether the bin that was copied was the final bin of the image (162). If not, GPU 36 returns to step 150 and renders the next bin of the image. If the bin that was copied was the final bin of the image, GPU 36 may move on to rendering the next image (164).

It should also be understood that, depending on the example, certain acts or events of any of the methods described herein can be performed in a different sequence, may be added, merged, or left out all together (e.g., not all described acts or events are necessary for the practice of the method). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored as one or more instructions or code on an article of manufacture comprising a non-transitory computer-readable medium. Computer-readable media may include computer data storage media. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The code may be executed by one or more processors, such as one or more DSPs, general purpose microprocessors, ASICs, FPGAs, or other equivalent integrated or discrete logic circuitry. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for rendering graphics data, the method comprising:
   rendering a first bin that is associated with a first portion of an image, wherein rendering the first bin comprises rendering pixels of the first portion of the image and one or more pixels that are located outside the first portion of the image that are associated with a second, different bin;
   storing the pixels of the first bin and the one or more pixels that are located outside of the first portion of the image to a local memory of a graphics processing unit;
   applying at least one filter to the one or more pixels that are located outside of the first portion and one or more of the pixels of the first bin stored to the local memory; and
   rendering the second bin, wherein rendering the second bin comprises rendering the one or more pixels that are located outside the first portion of the image and associated with the second bin, such that the one or more pixels located outside the first portion of the image are rendered during rendering of both the first bin and the second bin.

2. The method of claim 1, wherein rendering the one or more pixels located outside the first portion when rendering the first bin comprises determining an overlap region for the first bin that overlaps with the second bin and includes the one or more pixels located outside of the first portion.

3. The method of claim 2, wherein determining the overlap region comprises determining a fixed pixel width for the overlap region.

4. The method of claim 2, wherein applying the at least one filter comprises selecting one or more pixel filters for filtering the one or more pixels, and wherein determining the overlap region comprises determining the overlap region based on the selected one or more pixel filters.

5. The method of claim 1, wherein applying the at least one filter comprises:
   scaling a resolution of primitives of the first bin including applying a filter to the pixel values of the one or more pixels located outside the first portion of the image; and
   storing the scaled primitives of the first bin to a frame buffer that is separate from the local memory.

6. The method of claim 5, wherein applying the at least one filter comprises executing a filter kernel that specifies the filter.

7. The method of claim 1,
   wherein rendering the one or more pixels located outside of the first portion when rendering the first bin comprises generating visibility information indicating whether each pixel of the first bin and the one or more pixels located outside the first portion are visible in the image;
   wherein rendering the second bin comprises generating visibility information indicating whether each pixel of the second bin is visible in the image, the visibility information indicating whether the one or more pixels associated with the second bin are visible in the first bin and the second bin.

8. The method of claim 7, wherein generating the visibility information comprises generating a first visibility stream for the first bin and generating a second visibility stream for the second bin, such that the first visibility stream and the second visibility stream include a visibility indication for the one or more pixels located outside the first portion of the image.

9. The method of claim 7, wherein generating the visibility information comprises determining the visibility information based on a coarse rasterization of the first bin and the second bin.

10. The method of claim 7, wherein rendering the one or more pixels that are located outside the first portion when rendering the first bin comprises:
    determining scissor parameters for the first bin that includes the first portion of the image and at least a portion of the one or more pixels located outside the first portion; and
    rendering the first bin using the scissor parameters.

11. The method of claim 10, wherein the scissor parameters are associated with a different portion of the image than the visibility information for the first bin.

12. The method of claim 1, further comprising, prior to rendering the first bin, determining that the at least one filter is to be applied, and wherein the rendering of the one or more pixels that are located outside the first portion of the image is performed based on the determination.

13. A device for rendering graphics data, the device comprising:
    a memory storing the graphics data; and
    one or more processors configured to:
       render a first bin that is associated with a first portion of an image, wherein to render the first bin the one or more processors are configured to render pixels of the first portion of the image and
       one or more pixels that are located outside the first portion of the image that are associated with a second, different bin;
       store the pixels of the first bin and the one or more pixels that are located outside of the first portion of the image to a local memory of a graphics processing unit;
       apply at least one filter to the one or more pixels that are located outside of the first portion and one or more of the pixels of the first bin stored to the local memory; and
       render the second bin, wherein rendering the second bin comprises rendering the one or more pixels that are located outside the first portion of the image and associated with the second bin, such that the one or more pixels located outside the first portion of the image are rendered during rendering of both the first bin and the second bin.

14. The device of claim 13, wherein to render the one or more pixels located outside the first portion when rendering the first bin, the one or more processors are configured to determine an overlap region for the first bin that overlaps with the second bin and includes the one or more pixels located outside of the first portion.

15. The device of claim 14, wherein to determine the overlap region, the one or more processors are configured to determine a fixed pixel width for the overlap region.

16. The device of claim 14, wherein to apply the at least one filter, the one or more processors are further configured to select one or more pixel filters for filtering the one or more pixels, and wherein to determine the overlap region, the one or more processors are configured to determine the overlap region based on the selected one or more pixel filters.

17. The device of claim 13, wherein to apply the at least one filter, the one or more processors are further configured to:
scale a resolution of primitives of the first bin including applying a filter to the pixel values of the one or more pixels located outside the first portion of the image; and
store the scaled primitives of the first bin to a frame buffer that is separate from the local memory.

18. The device of claim 17, wherein to apply the at least one filter, the one or more processors are configured to execute a filter kernel that specifies the filter.

19. The device of claim 13,
wherein to render the one or more pixels located outside of the first portion when rendering the first bin, the one or more processors are configured to generate visibility information indicating whether each pixel of the first bin and the one or more pixels located outside the first portion are visible in the image;
wherein to render the second bin, the one or more processors are configured to generate visibility information indicating whether each pixel of the second bin is visible in the image, the visibility information indicating whether the one or more pixels associated with the second bin are visible in the first bin and the second bin.

20. The device of claim 19, wherein to generate the visibility information, the one or more processors are configured to generate a first visibility stream for the first bin and generating a second visibility stream for the second bin, such that the first visibility stream and the second visibility stream include a visibility indication for the one or more pixels located outside the first portion of the image.

21. The device of claim 19, wherein to generate the visibility information, the one or more processors are configured to determine the visibility information based on a coarse rasterization of the first bin and the second bin.

22. The device of claim 19, wherein to render the one or more pixels that are located outside the first portion when rendering the first bin, the one or more processors are configured to:
determine scissor parameters for the first bin that includes the first portion of the image and at least a portion of the one or more pixels located outside the first portion; and
render the first bin using the scissor parameters.

23. The device of claim 22, wherein the scissor parameters are associated with a different portion of the image than the visibility information for the first bin.

24. The device of claim 13, wherein the one or more processors are further configured to, prior to rendering the first bin, determine that the at least one filter is to be applied, and wherein the rendering of the one or more pixels that are located outside the first portion of the image is performed based on the determination.

25. A device for rendering graphics data, the device comprising:
means for rendering a first bin that is associated with a first portion of an image, wherein the means for rendering the first bin comprises means for rendering pixels of the first portion of the image and one or more pixels that are located outside the first portion of the image that are associated with a second, different bin;
means for storing the pixels of the first bin and the one or more pixels that are located outside of the first portion of the image to a local memory of a graphics processing unit;
means for applying at least one filter to the one or more pixels that are located outside of the first portion and one or more of the pixels of the first bin stored to the local memory; and
means for rendering the second bin, wherein rendering the second bin comprises rendering the one or more pixels that are located outside the first portion of the image and associated with the second bin, such that the one or more pixels located outside the first portion of the image are rendered during rendering of both the first bin and the second bin.

26. The device of claim 25, wherein the means for rendering the one or more pixels located outside the first portion when rendering the first bin comprises means for determining an overlap region for the first bin that overlaps with the second bin and includes the one or more pixels located outside of the first portion.

27. The device of claim 25,
wherein the means for rendering the one or more pixels located outside of the first portion when rendering the first bin comprises means for generating visibility information indicating whether each pixel of the first portion and the one or more pixels located outside the first bin are visible in the image;
wherein the means for rendering the second bin comprises means for generating visibility information indicating whether each pixel of the second bin is visible in the image, the visibility information indicating whether the one or more pixels associated with the second bin are visible in the first bin and the second bin.

28. A non-transitory computer-readable medium having instructions stored thereon that, when executed, cause one or more processors to:
render a first bin that is associated with a first portion of an image, wherein to render the first bin the instructions cause the one or more processors to render pixels of the first portion of the image and one or more pixels that are located outside the first portion of the image that are associated with a second, different bin;
store the pixels of the first bin and the one or more pixels that are located outside of the first portion of the image to a local memory of a graphics processing unit;
apply at least one filter to the one or more pixels that are located outside of the first portion and one or more of the pixels of the first bin stored to the local memory; and
render the second bin, wherein to render the second bin, the instructions cause the one or more processors to render the one or more pixels that are located outside the first portion of the image and associated with the second bin, such that the one or more pixels located outside the first portion of the image are rendered during rendering of both the first bin and the second bin.

29. The non-transitory computer-readable medium of claim 28, wherein to render the one or more pixels located outside the first portion when rendering the first bin, the instructions cause the one or more processors to determine an overlap region for the first bin that overlaps with the second bin and includes the one or more pixels located outside of the first portion.

30. The non-transitory computer-readable medium of claim 28,
   wherein to render the one or more pixels located outside of the first portion when rendering the first bin, the instructions cause the one or more processors to generate visibility information indicating whether each pixel of the first bin and the one or more pixels located outside the first portion are visible in the image;
   wherein to render the second bin, the instructions cause the one or more processors to generate visibility information indicating whether each pixel of the second bin is visible in the image, the visibility information indicating whether the one or more pixels associated with the second bin are visible in the first bin and the second bin.

\* \* \* \* \*